Nov. 3, 1959 V. C. PATTERSON 2,910,837
CONTINUOUS PACKAGED FOOD FREEZER
Filed July 16, 1956 13 Sheets-Sheet 2

INVENTOR
VELT C. PATTERSON
BY Howson & Howson
ATTORNEYS

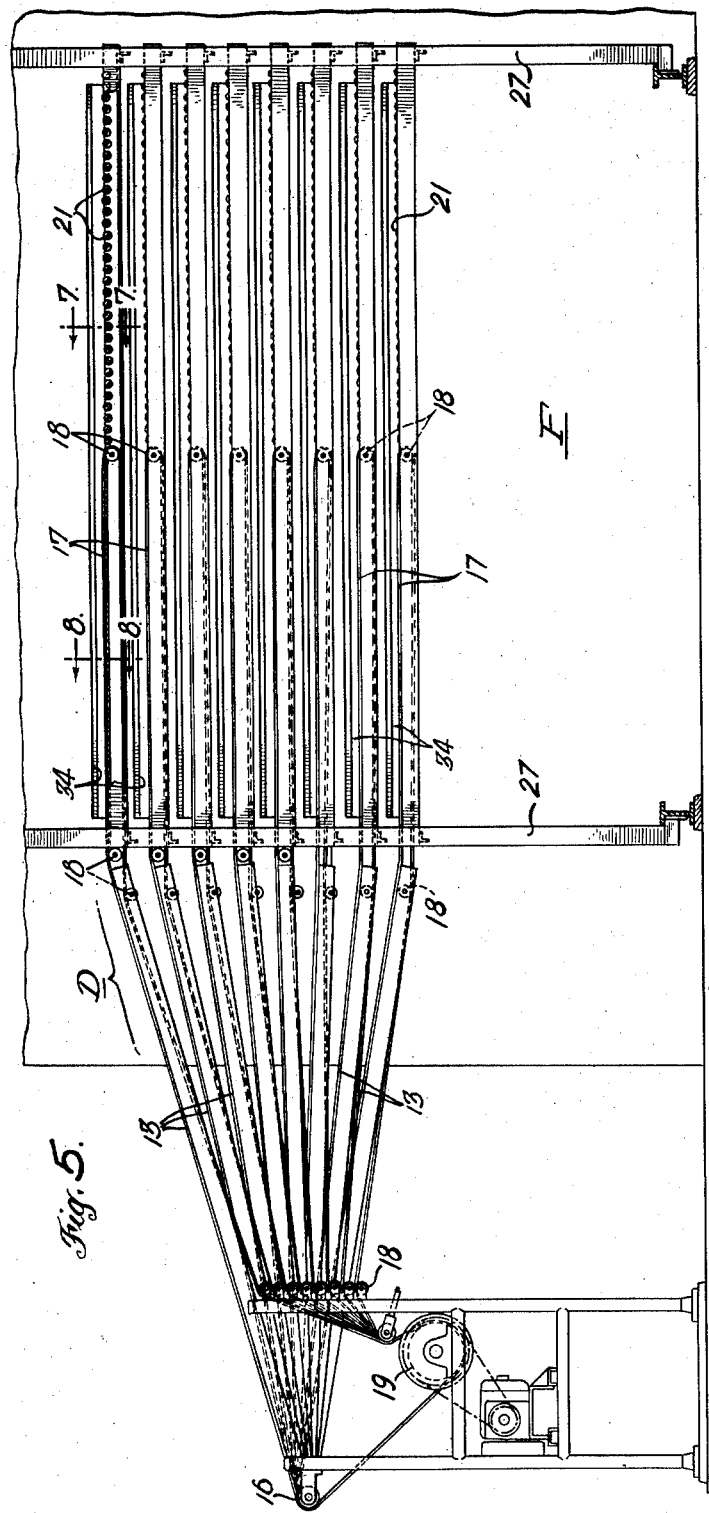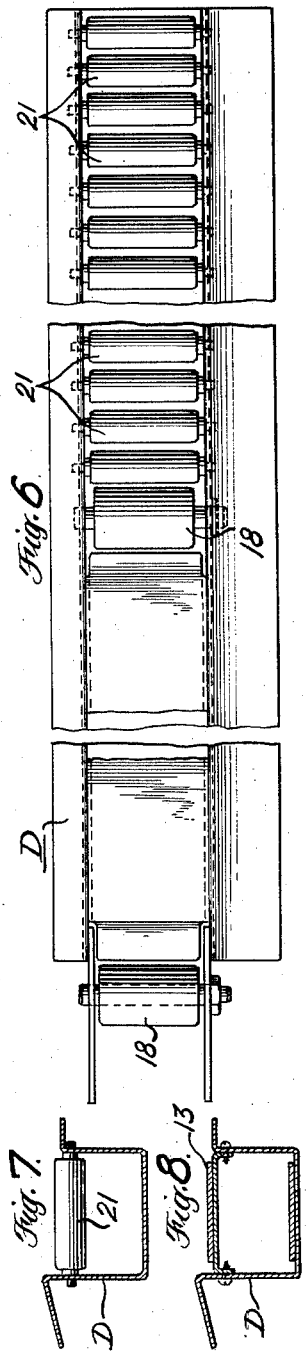

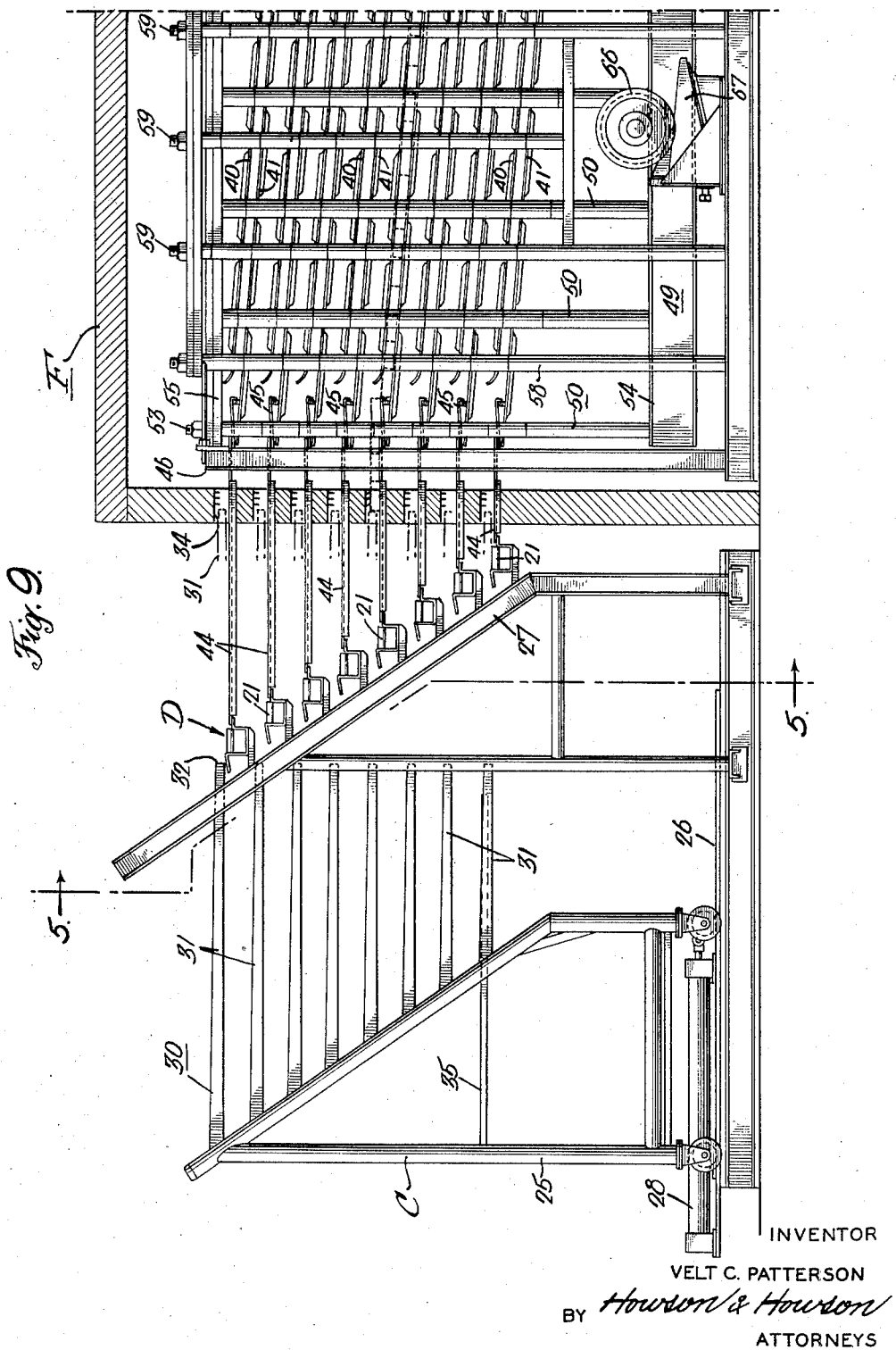

Nov. 3, 1959
V. C. PATTERSON
2,910,837
CONTINUOUS PACKAGED FOOD FREEZER
Filed July 16, 1956
13 Sheets-Sheet 5
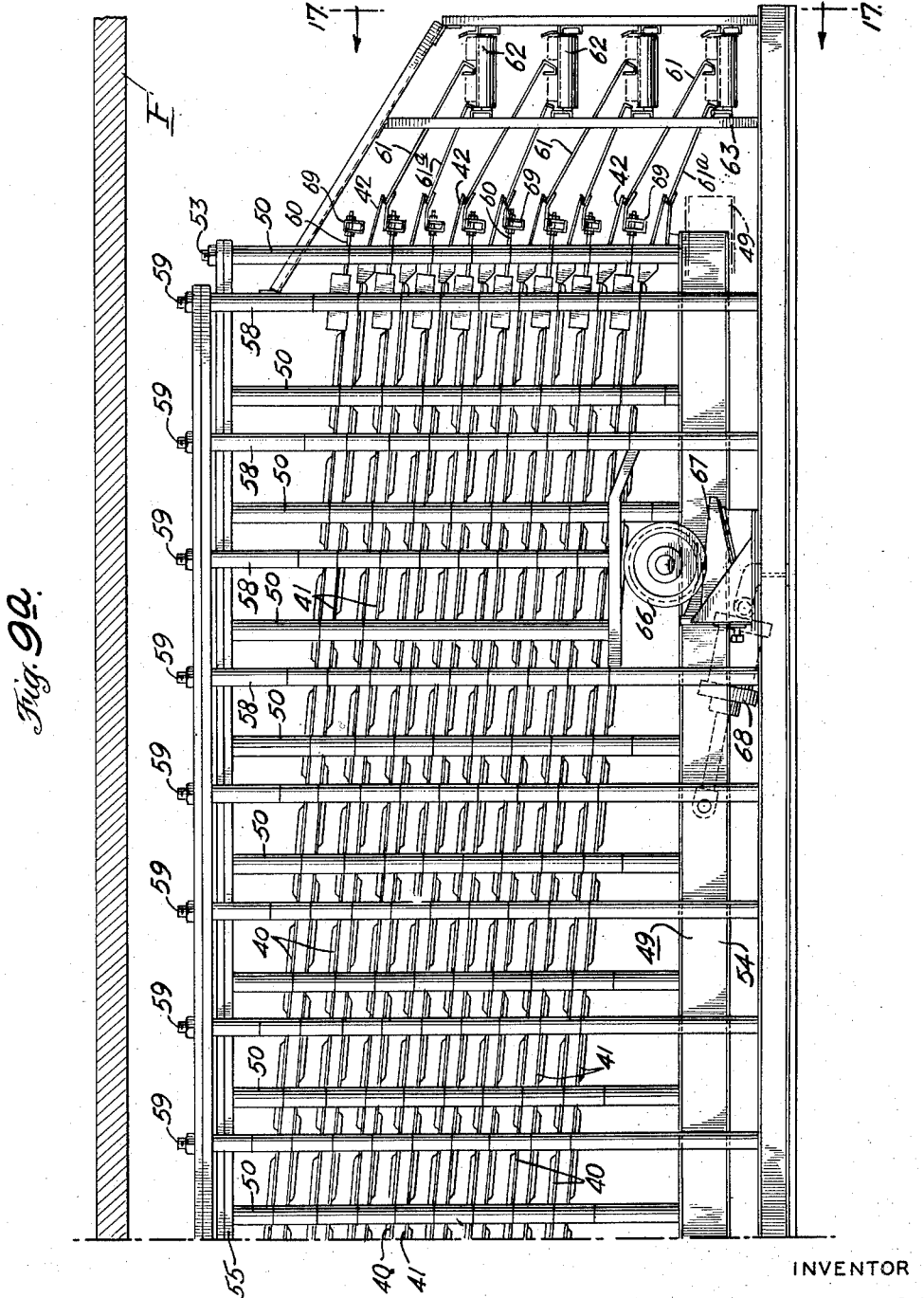
INVENTOR
VELT C. PATTERSON
BY Howson & Howson
ATTORNEYS

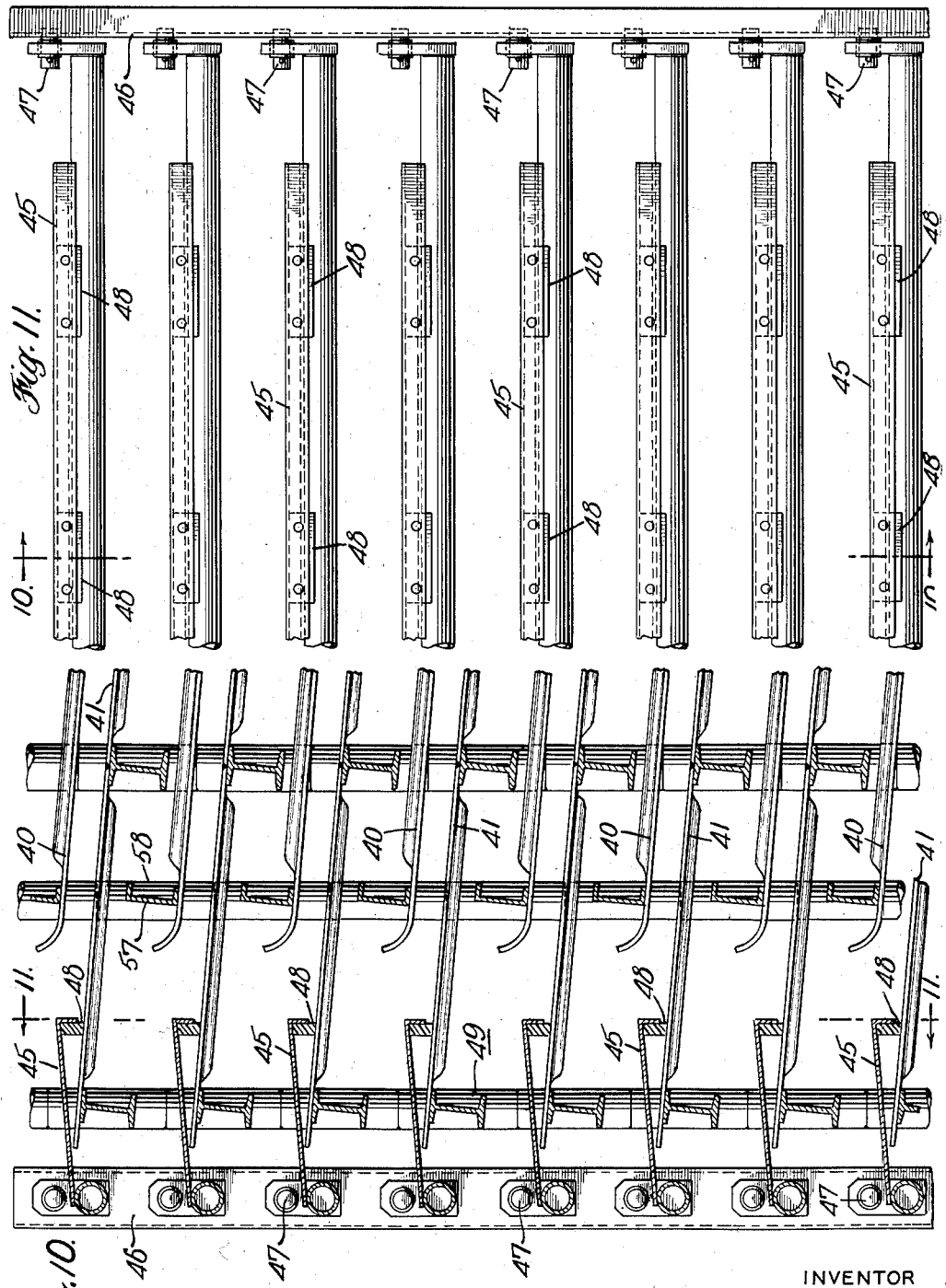

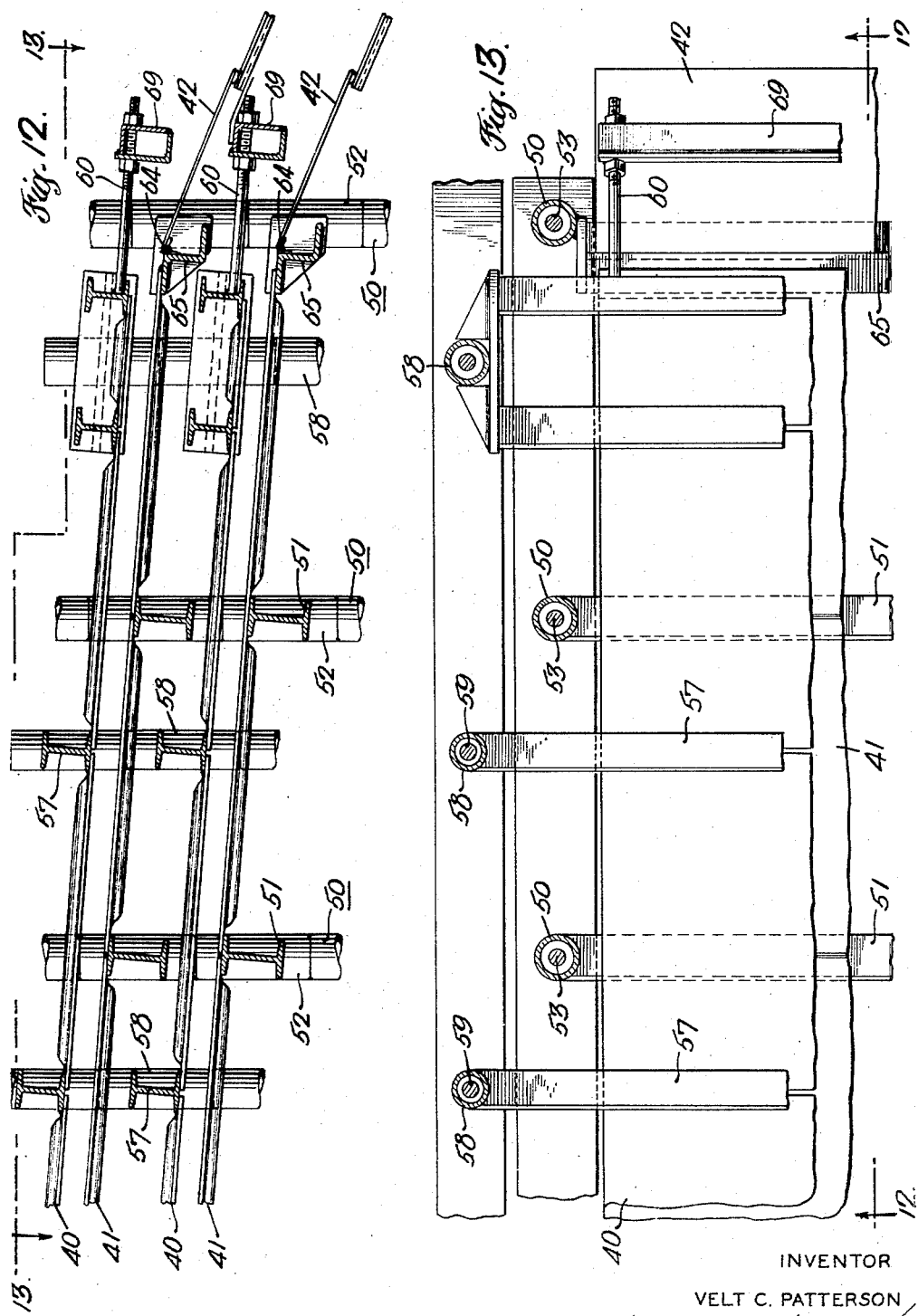

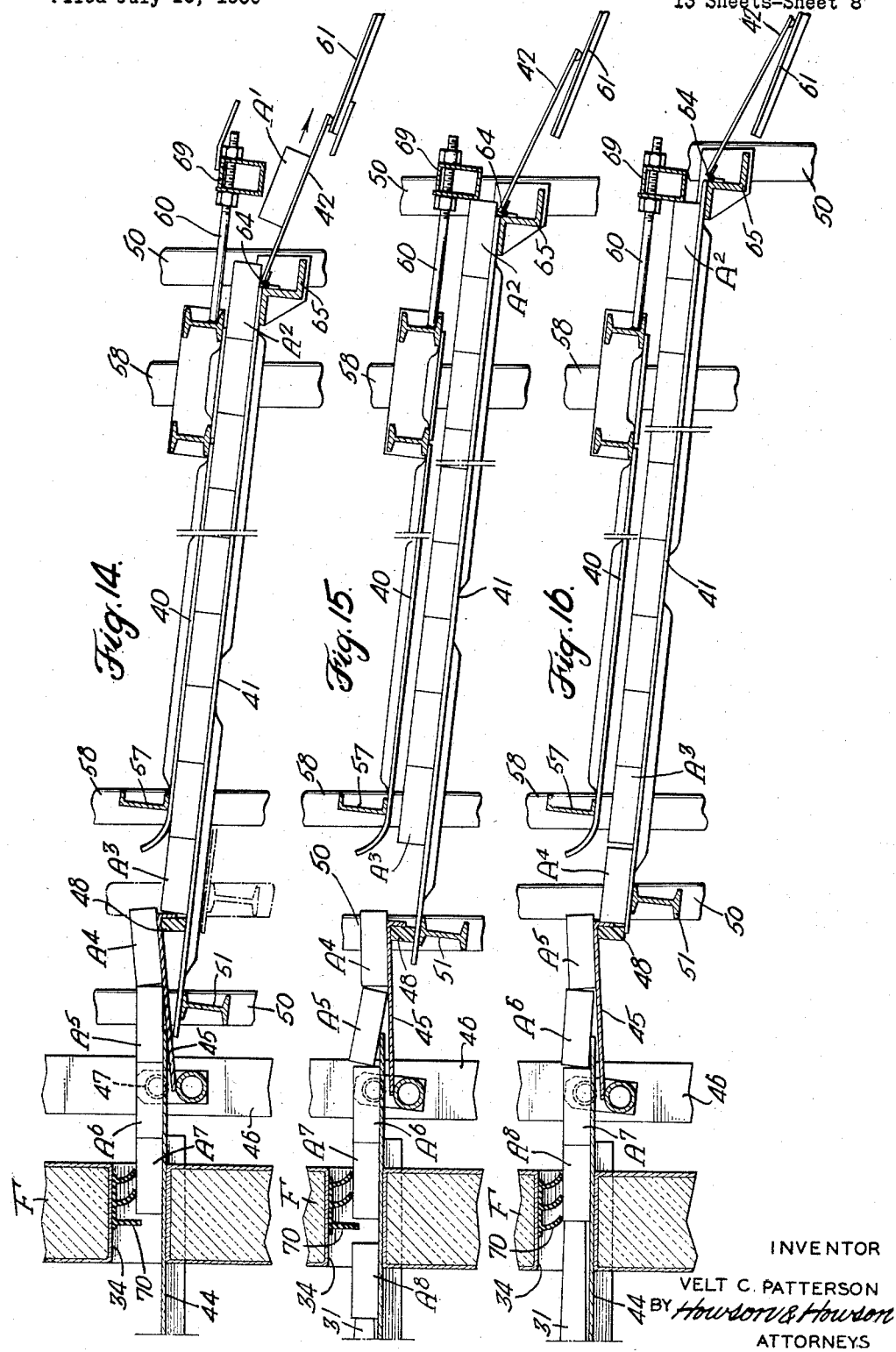

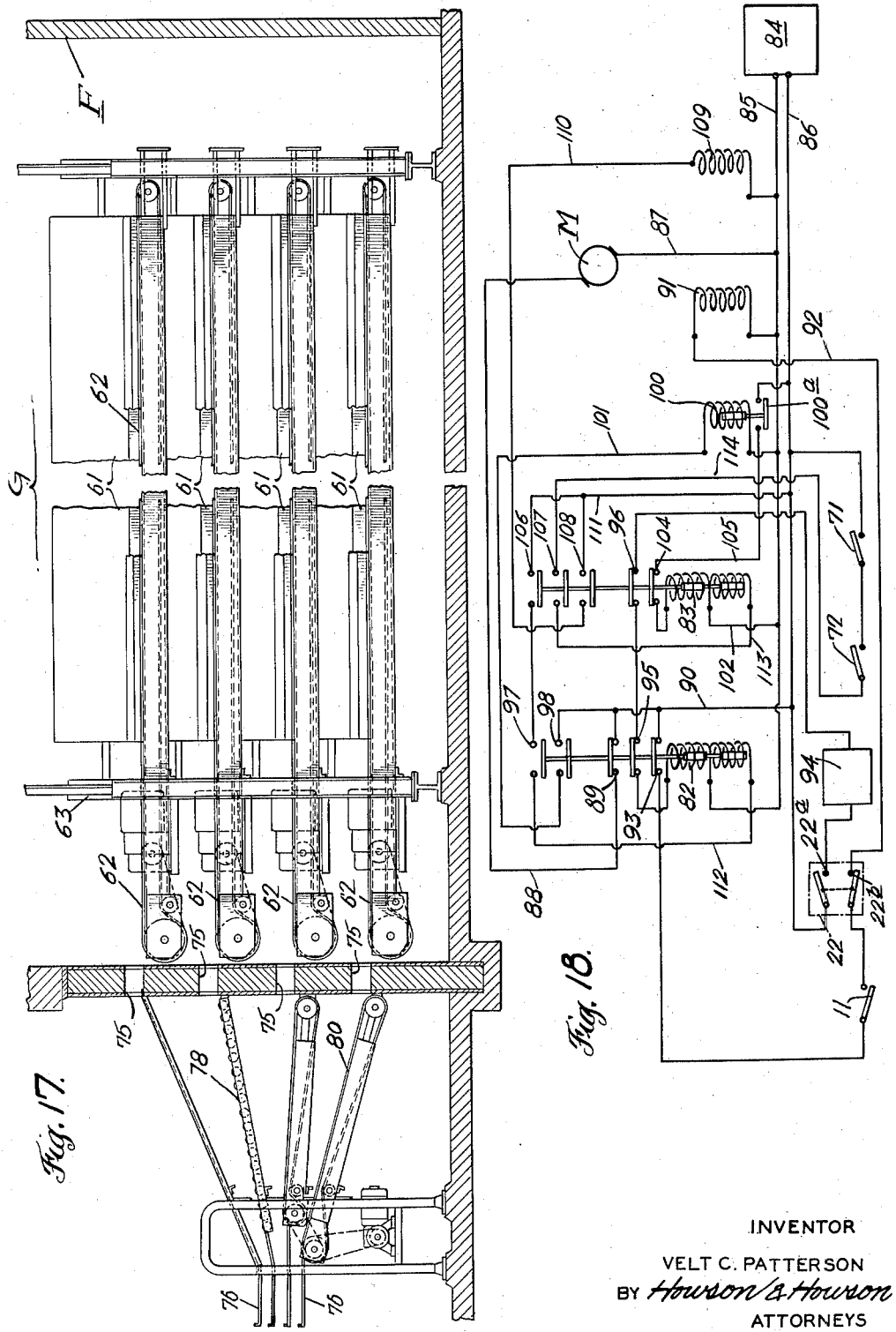

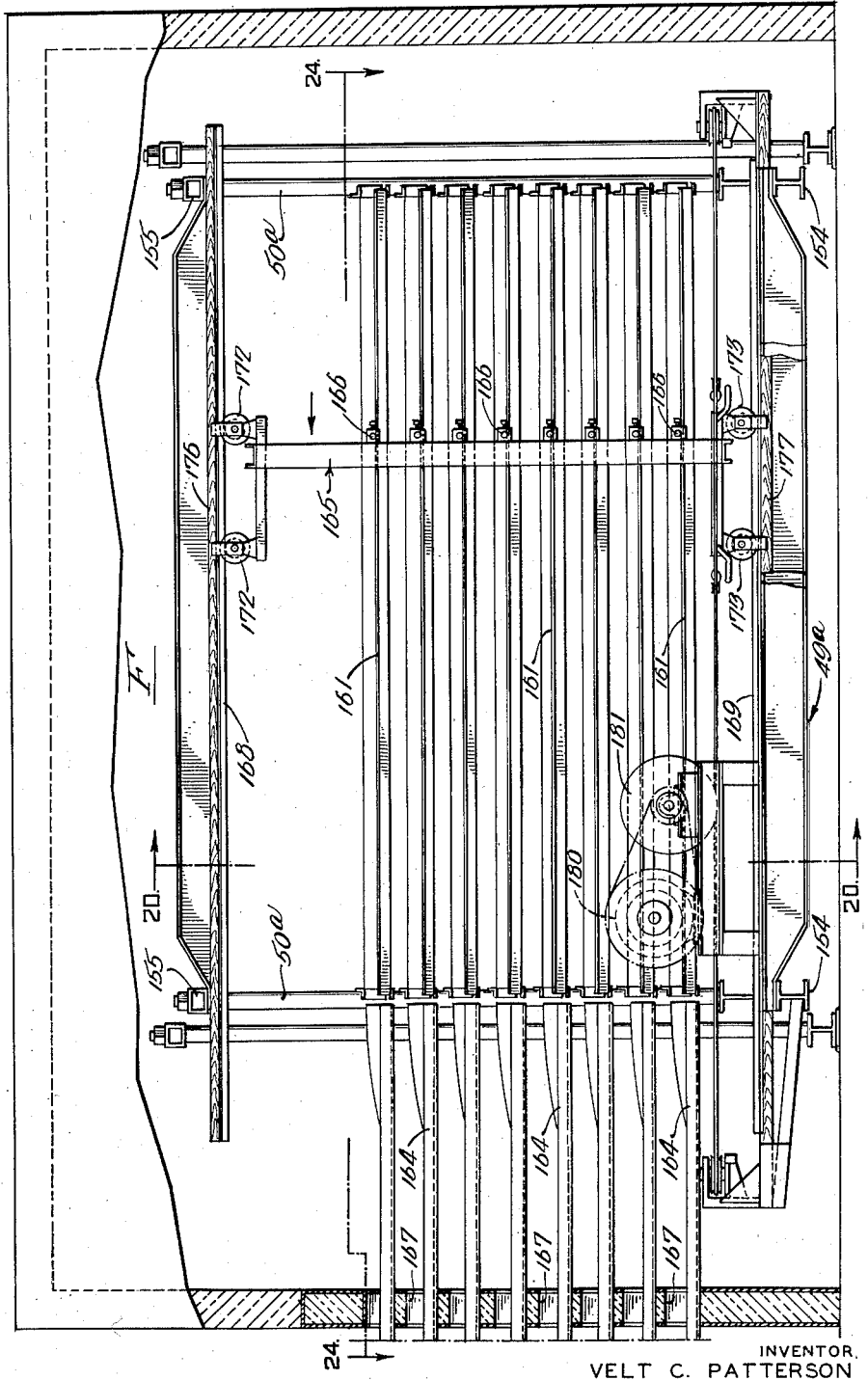

Nov. 3, 1959 V. C. PATTERSON 2,910,837
CONTINUOUS PACKAGED FOOD FREEZER
Filed July 16, 1956 13 Sheets-Sheet 11
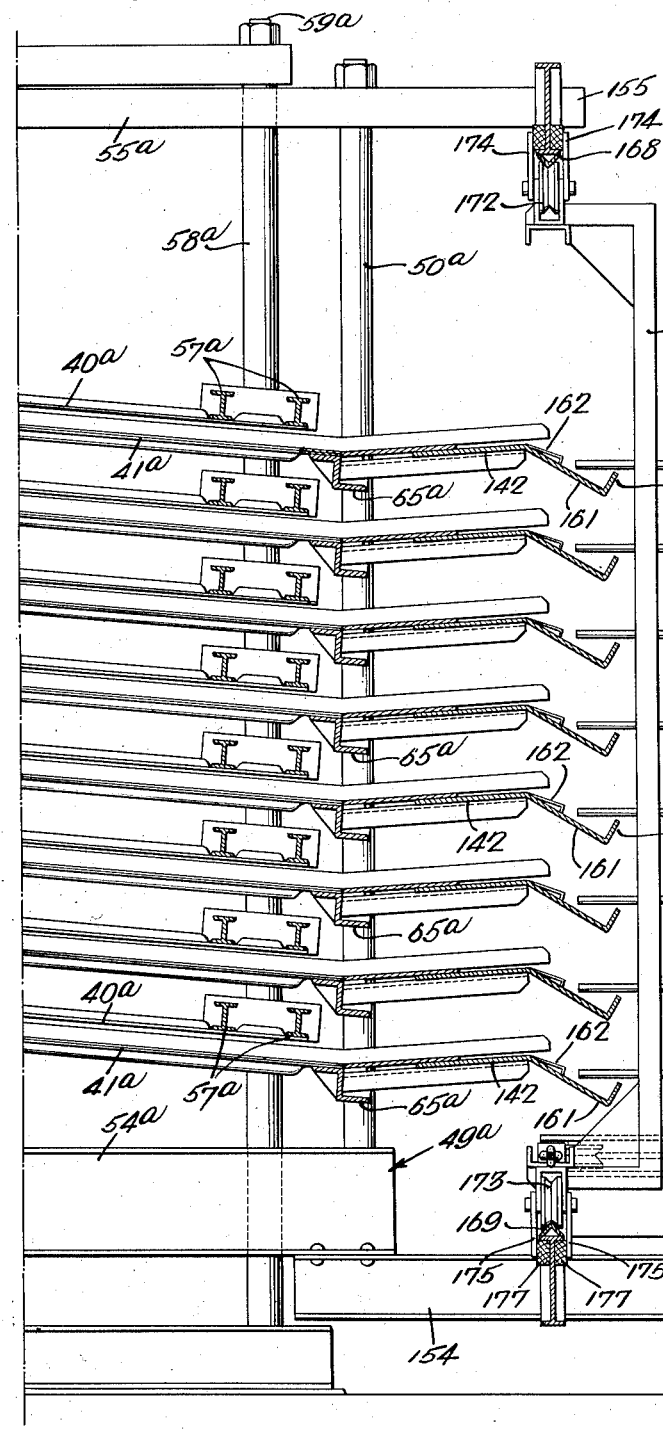
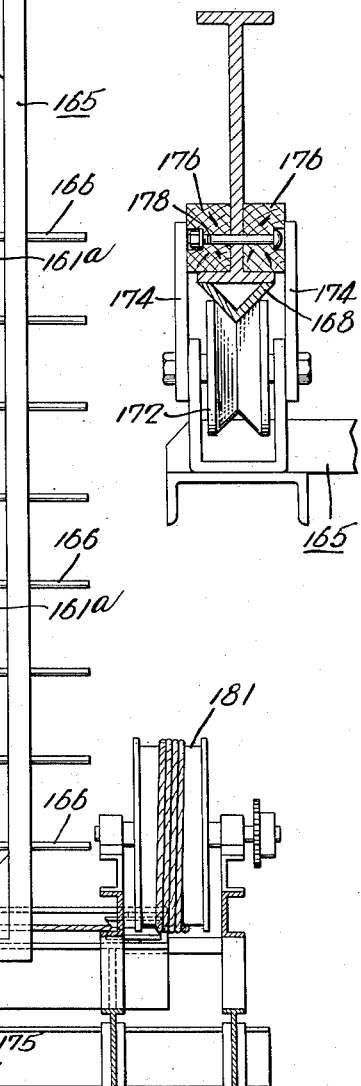
FIG. 20.
FIG. 21.
INVENTOR:
VELT C. PATTERSON
BY Howson & Howson
ATTYS.

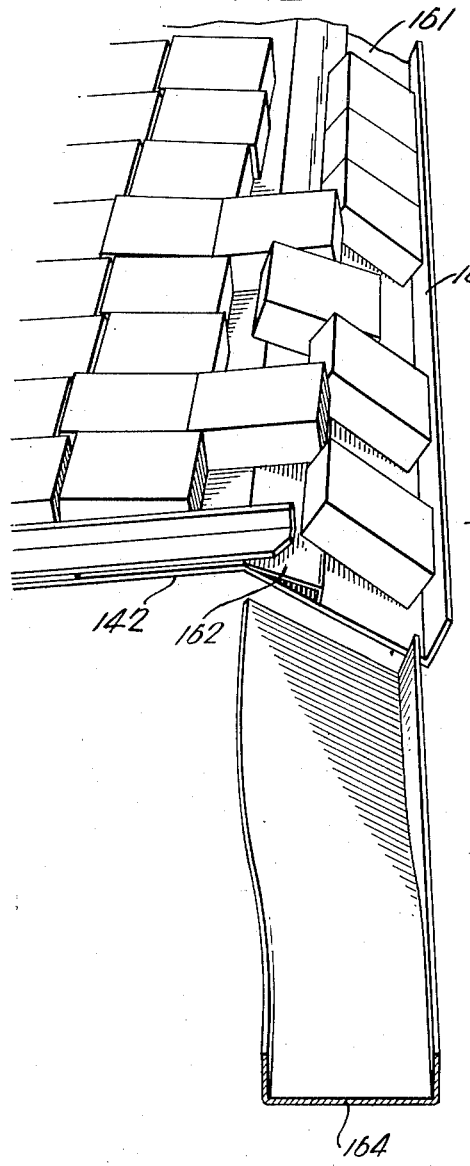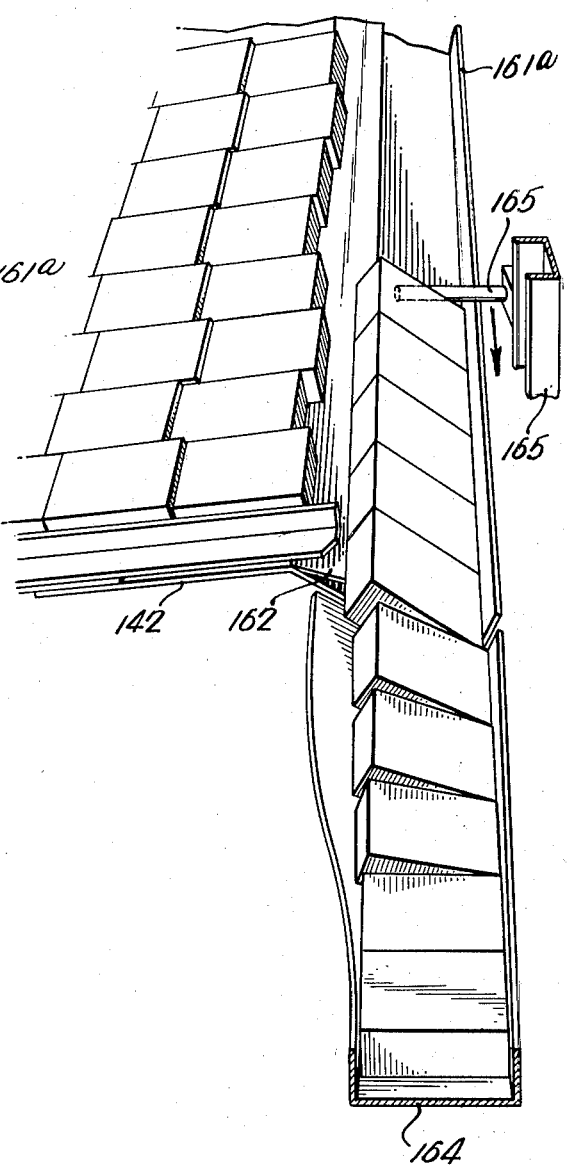

Nov. 3, 1959    V. C. PATTERSON    2,910,837
CONTINUOUS PACKAGED FOOD FREEZER
Filed July 16, 1956    13 Sheets-Sheet 13
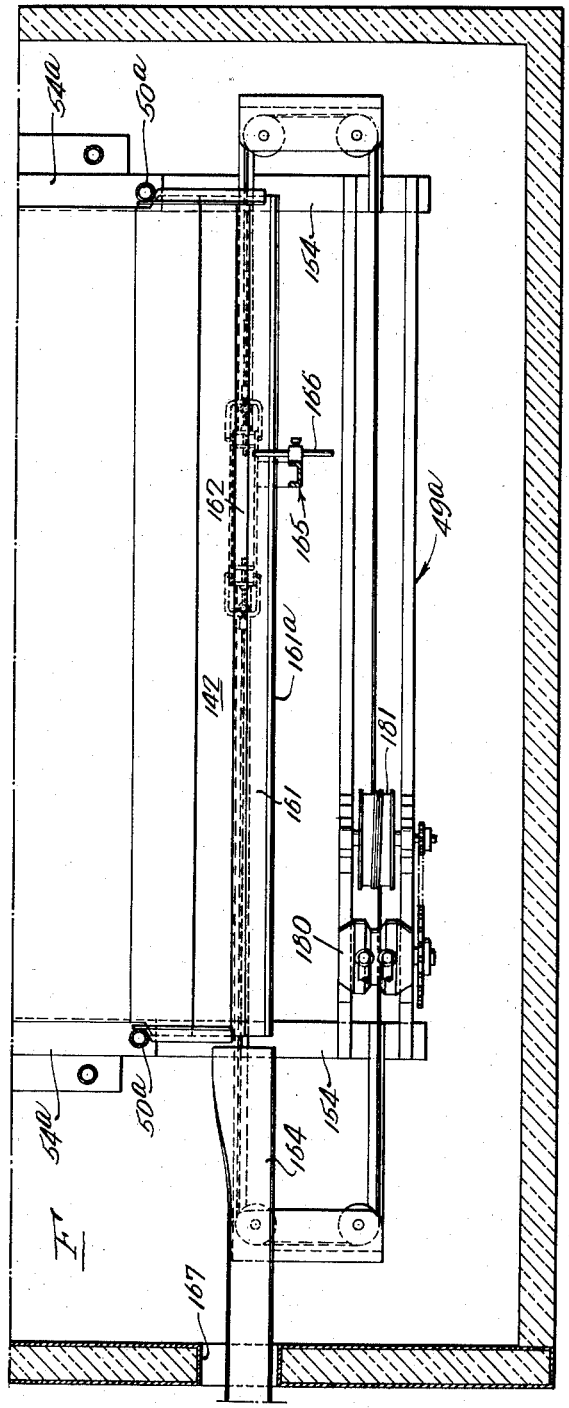
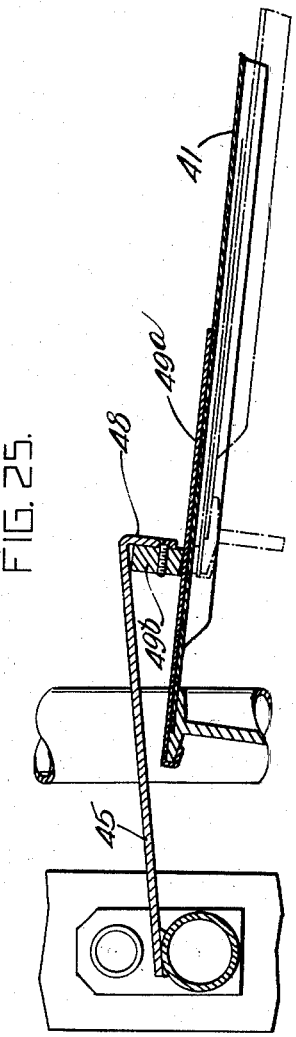
INVENTOR:
VELT C. PATTERSON
BY Howson & Howson
ATTYS.

United States Patent Office 2,910,837
Patented Nov. 3, 1959

2,910,837

CONTINUOUS PACKAGED FOOD FREEZER

Velt C. Patterson, Philadelphia, Pa., assignor to Patterson Freezer Corp., Philadelphia, Pa., a corporation of Pennsylvania Application July 16, 1956, Serial No. 599,673

20 Claims. (Cl. 62—132)

The present invention relates to freezing apparatus, and more particularly to apparatus for freezing frozen food packages. This application is a continuation-in-part of my application Serial No. 461,836, filed October 12, 1954, now abandoned.

In prior freezing devices of this character, a pair of opposed plates are alternately brought together and separated to compress and freeze therebetween a full complement of frozen food packages. Means is provided during the separation of the plates to remove all of the packages contained therebetween and to insert a second complement of unfrozen packages. The present invention contemplates novel apparatus affording continuous operation of the freezing unit and which automatically feeds packages to the unit, alternately compresses and advances the packages between the plates stepwise through the unit to freeze the same, and then discharges them.

A further object of the invention is to provide novel apparatus which positively displaces the packages within the freezer so that there is substantially no possibility of the packages becoming frozen to the plates during the freezing operation, and jamming the apparatus so that the packages must be forcibly dislodged before continuing the operation.

A further object of the present invention is to provide apparatus having improved mechanical controls which afford continuous automatic operation of the freezing unit with a minimum of supervision.

These and other objects of the present invention and the various features and details of the construction and operation thereof are more fully set forth hereinafter with reference to the accompanying drawings wherein:

Fig. 5 is an elevational view looking as indicated by the line 5—5 in Fig. 9, illustrating the distributing device which conveys the packages from the loading unit to the freezer unit;

Fig. 6 is an enlarged fragmentary plan view of the straight run of one conveyor of the distributing device;

Fig. 7 is an enlarged cross sectional view on line 7—7 of Fig. 5;

Fig. 8 is an enlarged cross sectional view on line 8—8 of Fig. 5;

Figs. 9 and 9a are vertical sectional views of the feed end and discharge end respectively of the freezer unit;

Fig. 10 is an enlarged vertical sectional view illustrating details of construction at the feed end of the freezer unit, the section being taken on the line 10—10 of Fig. 11;

Fig. 11 is a view looking toward the left in Fig. 10 at the line 11—11;

Fig. 12 is an enlarged vertical sectional view illustrating the details and construction at the discharge end of the freezer unit, the section being taken on the line 12—12 of Fig. 13;

Fig. 13 is a plan sectional view taken on the line 13—13 of Fig. 12;

Figs. 14 to 16 are fragmentary sectional views similar to Figs. 10 and 12 showing the position of the frozen food packages in the unit in successive stages of the operation of the unit;

Fig. 17 is an end view of the four level discharge conveyor unit viewed as indicated by the line 17—17 of Fig. 9a;

Fig. 18 is a wiring diagram of the installation;

Fig. 19 is a view similar to Fig. 17 showing a modified discharge conveyor within the scope of the present invention;

Fig. 20 is a transverse sectional view taken on the line 20—20 of Fig. 19;

Fig. 21 is an enlarged sectional view showing the construction of the upper guide for the pusher of the discharge conveyor;

Fig. 22 is a fragmentary perspective view showing the packages in the last stage of their discharge from the freezer plate;

Fig. 23 is a view similar to Fig. 22 showing the operation of the pusher of the discharge conveyor;

Fig. 24 is a sectional view taken on the line 24—24 of Fig. 19; and,

Fig. 25 is a fragmentary sectional view similar to Fig. 14 showing a modified construction of the freezer adjacent the inlet end of the freezer plate.

Figure 1:
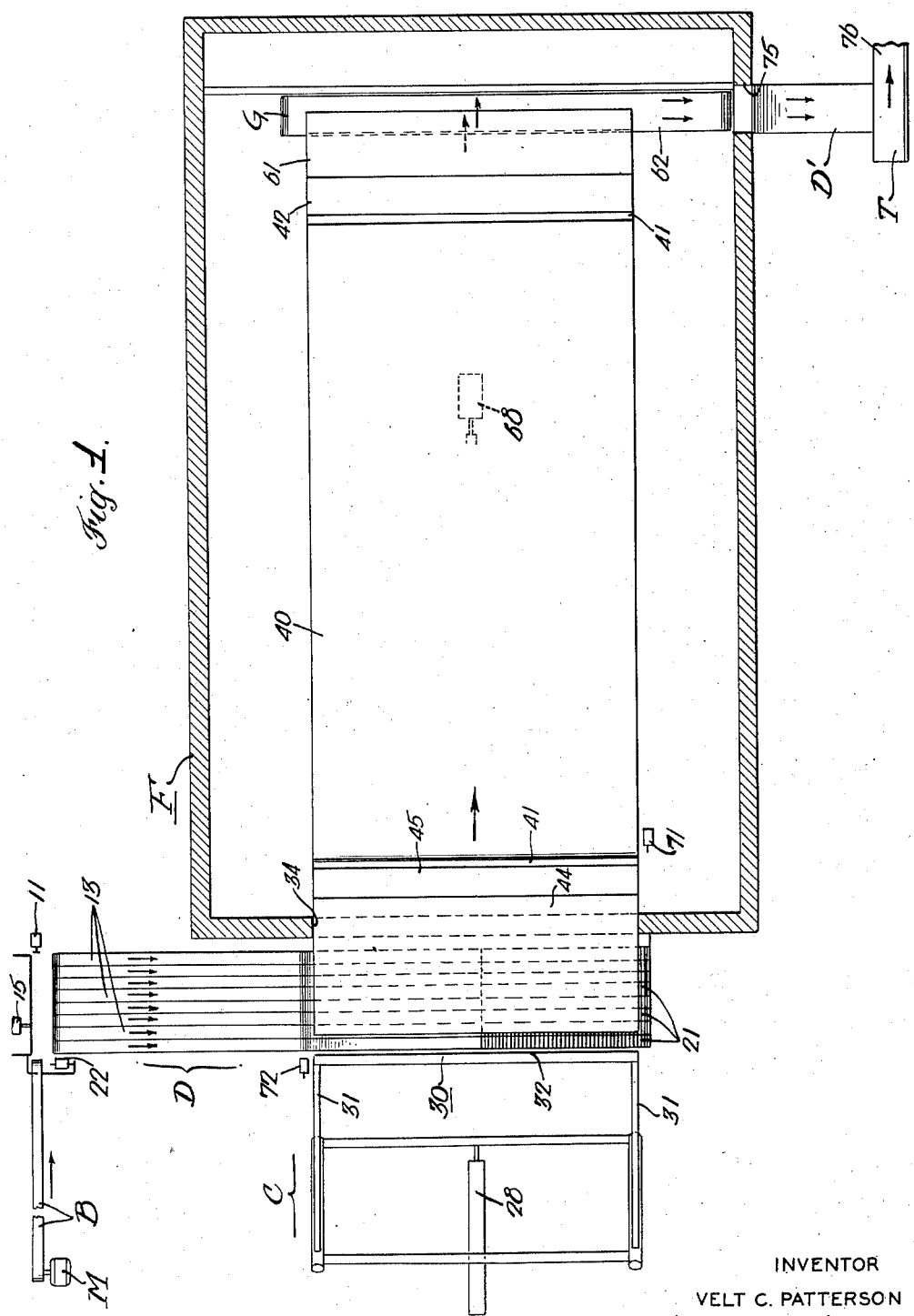
Fig. 1 is a diagrammatic plan view of the freezer installation showing the travel of the packages from the feed end of the installation to the discharge end.

Referring now to the drawings and more particularly to the diagrammatic plan view of Fig. 1, a line conveyor belt B carries filled and unfrozen packages A of foodstuffs from the processing equipment. An eight level distributor conveyor D carries the packages from the belt B to eight separate levels in front of a freezing unit F. When a full complement of packages is positioned at each of the separate levels of the distributor conveyor D, a loading ram C pushes the packages into the freezing unit F. The packages A travel through the freezing unit F and are frozen solid therein, as described in detail hereinafter, and are then discharged onto a discharge conveyor G at the discharge end of the freezing unit. The conveyor G carries the packages onto a delivery conveyor H which positions the packages on a table T for either manual or automatic casing of the frozen packages.

Referring now to Figs. 2 to 12 inclusive, the distributor D receives a continuous flow of aligned unfrozen packages A from the conveyor belt B and disposes them in front of the freezing unit F at a plurality of levels, each level having a row of packages containing a predetermined number. In the present instance, eight levels of twenty-five packages each are disposed in front of the freezing unit so that the unit handles two hundred packages at a time. It is obvious, however, that by changing the dimensions of the horizontal runs of the distributing conveyor D and the freezing unit F, the number of packages at the various levels may be changed in accordance with the requirement of each installation.

Figure 2:
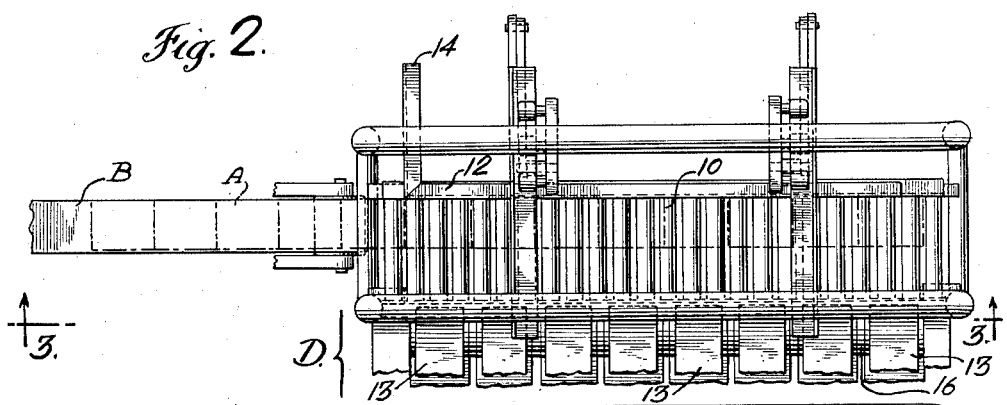
Fig. 2 is a plan view of the unit for loading the distributing device which positions the packages in front of the freezer unit.
Figure 3:
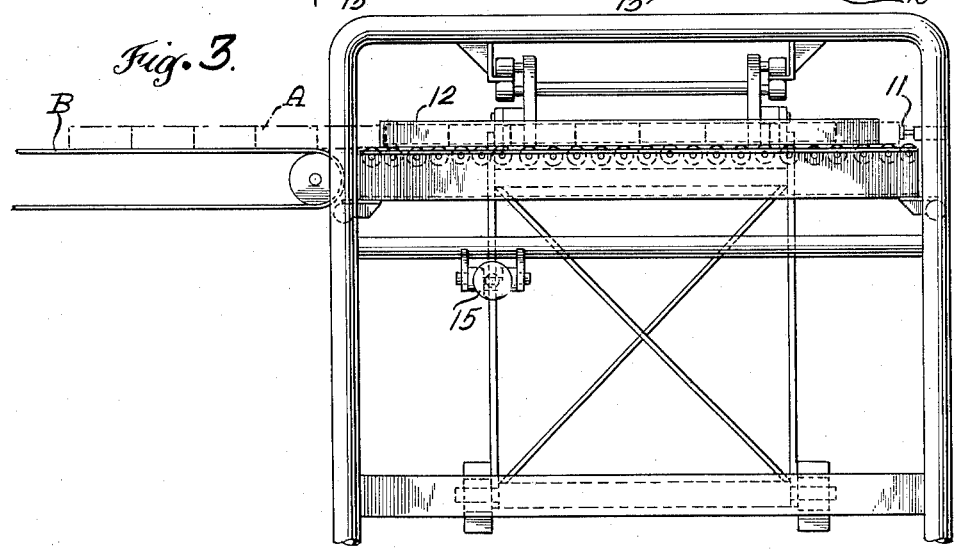
Fig. 3 is an elevational view of the loading unit looking in a direction of the arrows 3—3 in Fig. 2.
Figure 4:
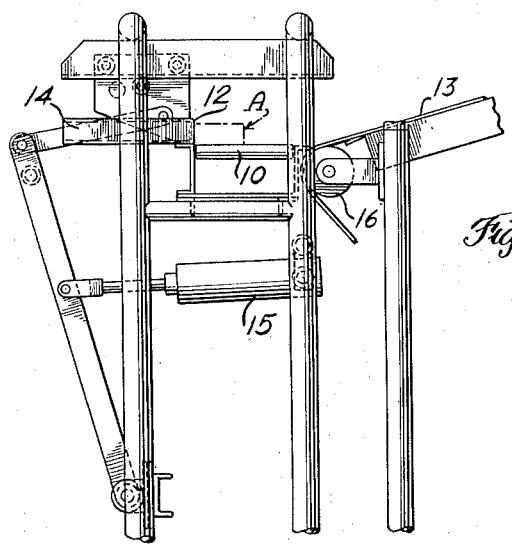
Fig. 4 is an end plan view of the loading unit looking to the right in Figs. 2 and 3.

As shown in Figs. 2 and 3, the conveyor belt B delivers the packages to a roller table 10 at the feed end of the distributing device D. When the roller table 10 receives the designated number of packages, a limit switch 11 is actuated energizing a solenoid valve (not shown) for controlling a cylinder 15 to operate a pusher bar 12. The pusher bar 12 displaces the packages onto individual belts 13 of the distributing conveyor D which convey the packages to the various levels. The left hand extremity of pusher 12 has a trailing arm 14 for engaging against the packages on the conveyor belt B and preventing their forward movement onto the roller table 10 while the pusher is advancing the packages onto the distributing belts 13.

The distributing belts 13 are trained around a common multiple pulley 16 and carry the packages each to a different level. As shown in Fig. 5, each conveyor belt 13 terminates at its opposite extremity in a horizontal run 17, the belt being guided by suitable idlers 18. A common multiple drive pulley 19 actuates all the conveyor belts 13 so as to cause uniform travel of the packages on all of the runs 17. As shown in Figs. 5 and 6, the horizontal runs terminate in a roller table 21 on which the packages are deposited.

Thus, in the operation of the distributing device D, the packages are fed to the roller table 10 by the belt B and when the designed number of packages are in position on the table 10, the pusher is actuated to advance the packages onto the distributor belts 13. A limit switch is provided at 22 (see Fig. 1) which operates when the pusher is at its forward limit position to de-energize the above-mentioned solenoid valve for the cylinder 15 and effect retraction of the pusher. The switch 22 has a second contact which is operated when the pusher is returned to the rearward limit position, actuating a counting device for a purpose more fully described hereinafter. When the pusher is returned to its rearward limit position, a succeeding set of the designated number of packages is positioned on the roller table 10 and the pusher is again actuated. When a predetermined number of actuations occur, for example twenty-five, the counting device stops the conveyor belt B and allows the full complement of the predetermined number of packages to reach the horizontal run 17 of the conveyor belt 13. Thus, the full complement of packages is lined up across the roller table 21 and the horizontal run 17 in front of the freezing unit. These packages are then pushed into the freezing unit as described more fully hereinafter and the conveyor belt B is again started in operation to reload the horizontal runs 17 and the roller tables 21.

The loading ram C operates to push the designated number of levels of packages from the runs 17 and the tables 21 into the freezer unit F. To this end, the loading ram comprises a movable framework 25 mounted for translation along a track 26 fixed to a framework 27 for supporting the horizontal runs of the distributing device D (see Fig. 9). A pressure cylinder 28 is associated with the framework to actuate the framework 25 forwardly when a full complement of packages is disposed on each of the levels of the distributor. In the illustrated embodiment, eight levels containing twenty-five packages each are positioned in front of the freezing unit F.

A pusher 30 is mounted on the framework 27 to engage each of the lines of packages at the various levels of the distributor D. As shown in Fig. 9, each pusher 30 comprises a pair of outwardly projecting arms 31, 31 having mounted between them an elongated abutment 32 for engaging the line of packages on the horizontal run of the distributor D. The abutments 32 of all the pushers are in vertical alignment so that when the loading ram C is advanced by the cylinder 28, the packages at all of the levels are displaced into the openings 34 in the forward face of the freezer unit F, as indicated in broken lines in Fig. 9.

In accordance with the invention, means is provided in the freezing unit to co-operate with the pushers 30 of the loading ram C to advance the packages stepwise through the unit to freeze the packages. To this end, the unit comprises a plurality of levels for receiving the packages corresponding in number to the designated number of levels in the distributor D. Each level of the freezer F comprises an upper fixed freezing plate 40 and a lower movable freezing plate 41.

In the operation of the freezer unit F, the movable plate 41 is reciprocated longitudinally and is simultaneously actuated toward and away from the fixed plate 40. When the movable plate is in its closed or upper limit position adjacent the fixed plate 40, the clearance is such as to provide pressure on the packages contained between the upper and lower plates. It is noted that the freezer plates are conventional refrigerated units, which when brought into pressure contact with the packages, freeze the same into a solid mass. When the movable plate is displaced into its open or lower limit position spaced from the fixed plate, the packages are free to travel longitudinally therealong toward the discharge tables 42 at the opposite end of the freezer unit (see Fig. 9a).

Referring now to Figs. 9, 10, and 14 to 16, the packages are fed into the freezing unit on a loading platform 44 which extends from the horizontal runs 17 and roller tables 21 into the freezer unit for a predetermined distance. Underlying the interior end of the loading platform 44 is a loading table 45 which is pivotally hung on a fixed upright 46 as indicated at 47, having its free end resting on the lower freezer plate 41, for example as shown at 48. As shown in Figs. 15 and 16, the table 45 is free to pivot upon movement of the movable plate 41.

In the preferred construction of the freezer, a scuff plate 49a is mounted on the lower freezer plate 41, as shown in Fig. 25. The free end 48 of the table 45 is formed with a scraper element 49b which extends continuously across the full width of the freezer plate. The element 49b is provided with a sharpened leading edge resting on the scuff plate 49a so that upon reciprocation upon the plate 49a under the element 49b, the element 49b scrapes the scuff plate 49a free of foreign material, such as ice, or the contents which may leak from the packages being frozen. Preferably, the scuff plate 49a is of stainless steel which is resistant to frictional wear by the element 49b and which is easily scraped clean by the action of the element on the scuff plate.

The movable plates 41 are mounted on a rack structure 49 comprising a plurality of uprights 50 which are spanned by cross beams 51 supporting the individual plates. To facilitate assembly and disassembly of the rack, each upright comprises a plurality of short pipe sections 52 which are mounted in aligned relation on a tie rod 53. The tie rods in turn are interconnected at their lower extremities by a beam 54 and at their upper extremities by a beam 55.

The fixed plates 40 are supported in a manner similar to the manner in which the plates 41 are supported. In this case, the plates 40 are supported by cross beams 57 which are mounted on pipe sections 58 assembled on tie rods 59 which are secured to the framework of the freezing unit.

It is noted that the plates 40 and 41 are arranged in pairs and that one plate of each pair is fixed, the other plate being movable by the movement of the rack structure 49. By this construction, only one surface of each freezing plate is in direct contact with the packages being frozen. Consequently, the opposite surface of the plate is open to the atmosphere in the freezing chamber F. The opposite surfaces of the plates, being substantially below the freezing point of any moisture in the unit, will cause the moisture to condense and frost on the opposite surfaces. This action of the freezer plates insures a relatively moisture-free atmosphere within the freezer without impairing the working surfaces of the freezer plates by reason of the accumulation of frost thereon. This construction, therefore, enables the freezer to be run for prolonged periods of time without defrosting.

At the opposite end of the freezing unit, the movable plates 41 are connected to individual discharge tables 42. The discharge table 42 spans the space between the plates 41 and the discharge chutes 61 and 61a. The chutes 61 and 61a direct the packages side by side on a discharge conveyor 62, for example as shown in Figs. 9a and 17. The discharge chutes 61 and 61a are fixed in the freezing housing F, for example as indicated, by the uprights 63 and in order to compensate for movement between the movable plates 41 and the discharge chutes 61 and 61a, the discharge table 42 is operable to ride on the upper extremity of the discharge chute (see Figs. 14 to 16). To this end, the discharge table 42 is pivotally secured as indicated at 64 to a Z-beam 65 supporting the trailing end of the movable plate 41. Thus, as the plate is displaced between its closed and open positions, the discharge table 42 is free to slide on the discharge chutes 61 and 61a.

Figs. 20 to 24 illustrate a modified arrangement of the discharge end of the freezer. The remaining portion of the freezer is similar to the construction described above, and corresponding reference characters followed by the character a have been applied to corresponding parts. In this arrangement, discharge tables 142 are fixedly mounted on the movable plates 41a with a slight upward inclination as shown in Fig. 20. Each discharge table 142 terminates in a discharge chute 161 which forms a slide for the conveyance of the frozen packages. Each chute 161 terminates in a stop flange 161a to limit the downward travel of the packages on the chute. The discharge chutes 161 therefore, travel back and forth with the lower plates 41a. It has been found that the packages A are not in perfect alignment as they are discharged from between the plates 40a and 41a because of slight variations in the length of the individual packages and in the distortion of the packages during the filling operation. Accordingly, as shown in Fig. 22, all the packages do not travel or fall down the discharge chute 161 together. In order to insure that the packages are maintained in alignment on the discharge chute, a projection 162 is mounted along the length of each chute 161. The projection 162 elevates the trailing end of the packages on the discharge chute 161 so that the packages which lag behind the others are still maintained intermediate the others and cannot ride above them. Consequently at the end of the discharge stroke of the lower plate 40a, the packages assume the aligned position against the upturned stop flange 161a illustrated in Fig. 23 on the discharge chute 161. Means is provided to slide the packages laterally along the chute 161 from the freezer to discharge the same, as will be described more fully hereinafter.

To provide for proper movement of the rack 49 supporting the movable plates 41, the lower beam is supported by wheels 66, 66 adjacent the forward and rearward ends of the freezing unit. The wheels roll on cam tracks 67, 67 which are adjustable to regulate the normal clearance between the fixed plate 40 and the movable plate 41 so that the boxes contained therebetween are not crushed but are acted upon with the proper degree of pressure. It is noted that since the upper plates 40 are all fixed, and the lower plates 41 are mounted on a common rack structure, the spacing between the fixed and movable plates may be varied by varying the path of movement of the rack 49. This adjustment to compensate for different thicknesses of packages is accomplished easily by simply adjusting the cam tracks 67 at each of their four locations in the freezing chamber F. A cylinder 68 (see Fig. 9a) is operatively connected to the lower beam 54 to actuate the rack 49 in proper sequence. The sequence of operation will be more fully described hereinafter.

In accordance with a primary object of the invention, and referring now to Figs. 14 to 16, the operation of the movable plate provides for stepwise advancement of the packages through the freezer unit. Fig. 14 illustrates the position of the plates and the packages at the close of the insertion operation performed by the pushers 30. It is noted that the package $A^1$ is discharged onto the discharge table 42 where it will slide onto the discharge chute 61 and thence to the discharge conveyor 62. The package $A^2$ is held at the delivery end of the movable plate 41 and the plate is loaded with the desired number of packages, the final package on the plate being indicated at $A^3$. Four packages $A^4$ to $A^7$ are positioned on the feed plate 44 and the feed table 45. The plates remain in this position for a period of time corresponding to the time it takes for the preselected number of packages, in the illustrated embodiment, two hundred, to be fed from the conveyor belt B into aligned position on the horizontal runs of the distributor D.

When the packages are properly positioned at the levels of the distributor D, the cylinder 68 is actuated to withdraw the plate 41 away from the table 40, and the cylinder 28 is also actuated to start operation of the pusher elements 30. The pusher elements 30 lag behind the movement of the movable plates 41, for example as shown in Fig. 15 so that the movable plate 41 is displaced forwardly before the pusher element 31 brings a package into the feed opening 34 of the freezer unit F. As the movable plate 41 is displaced forwardly, the first package $A^2$ on the plate engages against a bumper 69 which is adjustably mounted on the fixed plates 40 as indicated at 60. As shown in Fig. 15, the forward movement of the plate 41 causes the bumper 69 to displace the packages $A^2 \ldots A^3$ rearwardly on the plate.

It should be particularly noted that the bumper 69 engages against a solidly frozen package, i.e., the package $A^2$ which is completely frozen and ready for discharge from the freezer. The force exerted on a given package which may be frozen onto the plate is transmitted to it from the bumper through packages in advance thereof which have been on the freezer plate 41 for a period longer than the given package, so that the present invention insures that more solidly frozen packages are used to displace the less solidly frozen packages. This is extremely important when there is a package which leaks its contents which freeze solidly to the plate 41. Prior to the present invention, such "leakers" became so solidly frozen to the freezer plate that it was impossible to dislodge them without mutilating the boxes to a point where they could no longer be used commercially. By the present invention, a box remains in one position only for a relatively short period of time and it is dislodged from that place by the action of the bumper 69 against the solidly frozen packages on the plate. Thus, the bumper 69 displaces all of the packages $A^2 \ldots A^3$ rearwardly on the plate 41 only the relatively small distance sufficient to dislodge frozen packages from the plate. It is noted that the modified discharge construction illustrated in Figs. 19 to 24 inclusive eliminates a necessity for the bumper 69 since in normal operation, no box remains in one position long enough to become solidly frozen to the fixed plate. As shown in Fig. 15, the trailing edge of the last package $A^3$ is spaced sufficiently from the forward edge 48 of the table 45 to permit the package $A^4$ to drop into place between the package $A^3$ and the leading edge 48, as shown in Fig. 16.

After the movable plate 41 has stopped its forward movement, the pusher 30 continues moving the package $A^8$ from the distributing device D into the opening 34. Movement of the package into the opening 34 displaces the packages $A^4$ to $A^7$ forwardly so that the package $A^4$ falls onto the movable plate 41 between the package $A^3$ and the forward end 48 of the table. It is noted that no vertical pressure is exerted on the packages $A^4$ to $A^8$ inclusive while they are resting on the loading platform 44 and the feed table 45 so that the packages are easily advanced by the pressure of the pusher 30.

When the pusher has completed its advance, the package $A^8$ is within the opening 34, and flaps 70 depending from the upper edge of the opening to prevent passage of warm air into the freezer through the opening 34. Thus, the package serves as a closure for the opening. If desired, the pusher may advance the packages over the end of the table 45, and onto the plate 41. In this case, the flaps 70 would be longer to close the opening 34. A limit switch 71 (see Fig. 1) is actuated when the rack 49 carrying the movable plates 41 has completed its advance; and a limit switch 72 is actuated when the pusher has completed its advance to its forward limit position. When both limit switches 71 and 72 are closed, the pusher is retracted and the movable plates 41 are returned to the position shown in Fig. 14 by the cylinder.

The reverse movement of the freezer plates 41 discharges the last package on the plate, in this case the package $A^2$, onto the discharge table 42 where it will fall onto the discharge chute 62 and the conveyor 63. This is accomplished by the pressure of an abutment at the leading edge 48 of the table 45 against the last package on the freezer plate, in the present instance, the package $A^4$, which was discharged onto the freezer plate by the action of the pusher 30. The pressure from the abutment at 48 is exerted through the packages $A^4$, $A^3$ and the remaining packages on the freezer plate to the package $A^2$ as is apparent from the showing of Figs. 14 and 16.

As pointed out above, the modified construction of the freezer plate 41 adjacent the table 45 maintains the lower plate free from foreign material caused by leakage or excessively moist packages. The abutment element 49b is effective to dislodge any foreign matter which may be deposited on the scuff plate 49a when the element is displaced forwardly relative to the lower plate.

It is noted that the packages on the freezer plate have been subjected to action of the freezer plates under pressure and consequently there is a possibility that the packages may be frozen onto the lower plate 41. If this occurs, the force of the bumper 69 is sufficient to displace the packages rearwardly on the plate 41 so as to permit forward movement thereon when the plate is displaced rearwardly under the abutment 48. The pressure from the abutment 48 is transmitted through dislodged packages and there is little danger of collapsing the package and spilling the contents onto the freezer plates.

As seen in Figs. 9a and 18, in the present embodiment of the invention, the packages from the eight movable freezer plates 41 are discharged onto four conveyors 62 comprising the discharge mechanism G. This is accomplished by the different inclinations of the discharge chutes 61 and 61a respectively, the discharge chute 61 transferring the packages to the outer edge of the conveyor and the chute 61a transferring the package to the inner edge of the conveyor. Thus the packages are arranged side by side on the conveyor 62. The packages from the conveyor 62 are led out to the side of the freezing unit F and through discharge openings 75 therein.

From the discharge openings, the packages are compacted into four closely spaced layers on shelves as indicated at 76. To this end, the packages from the upper opening slide down an inclined delivery chute; the packages from the next lower opening slide down an inclined roller table 78; the packages from the lowest opening are fed up a second conveyor 80. Thus, the packages may be fed to delivery shelves 76 for manual casing. Alternatively, automatic casing mechanism may be provided to receive the frozen packages from the discharge chutes 61 or the conveyors 62.

In the modified discharge arrangement shown in Figs. 19 to 24, the rearward displacement of the plate 41a discharges the packages onto the discharge chutes 161 in proper alignment for discharge from the freezer. Means is provided to slide the packages endwise from the discharge chutes 161 and onto slides 164 which are in position to register with the chutes 161 when the plate 41a has completed its rearward movement. A pusher element 165 having pusher fingers 166 thereon is operable to engage the series of packages on each chute 161 to displace the series endwise of the chute onto the associated slide 164 and from there out of the freezer unit F through discharge openings 167.

The pusher 165 is guided between tracks 168 and 169 respectively at the upper and lower ends of the rack 49a mounting the movable plates 41a. To this end, the pusher 165 is provided with wheels 172 and 173 respectively engaging the tracks 168 and 169. The wheels are provided with upwardly projecting side plates 174, 174, and 175, 175 respectively engaging slide blocks 176, 176 and 177, 177 mounted on the tracks, for example as indicated at 178 in Fig. 21. The tracks are fixedly mounted on the rack structure 49a for reciprocatory movement therewith. For example, the track 168 is mounted on an extension of the beam 55a as indicated at 155 and the track 169 is mounted on an extension 154 of the beam 54a. The extension 154 also mounts the hydraulic motor 180 and rope drum 181 which operate to reciprocate the pusher 165 on the tracks 168 and 169.

In the operation of the device, the motor 180 is operated in timed relation to the movement of the rack structure 49a to displace the pusher 165 from the right hand to the left hand limit position thereof (as seen in Fig. 19) upon completion of the reverse movement of the freezer plates 41a. Travel of the pusher 165, by means of the fingers 166, displaces the packages on the chutes 161 onto the slides 164 from which they are discharged through the freezer wall openings 167. At the left hand limit of its travel, the motor 180 is reversed to immediately retract the pusher 165 to its right hand limit position. This occurs during the time when the plates are in relatively closed position, compressing the packages therebetween, and the movement is completed before the rack 49a has again been displaced to its right hand limit position. Thus, as the rack travels toward the left (see Fig. 20), the pusher 165 is in its starting position at the remote end of the freezer.

The control for the motor may consist of a limit switch which is closed when the rack assumes its left hand or closed limit position. Closure of the limit switch initiates operation of the motor, and the motor continues to operate until the rack has completed a cycle of movement across the discharge chute 161 and back to its initial position. The motor 180 is then deenergized until the aforementioned limit switch is again actuated.

Fig. 19 illustrates the freezer housing as having eight discharge apertures 167. However, the present arrangement may be modified to employ only four apertures. In this case, the alternate discharge slides 164 are provided with a steeper incline and are offset from the adjacent intermediate slides so that the packages from the alternate slides go through the same apertures as the packages from the intermediate slides in a side-by-side relationship. With this modified arrangement, exterior discharge conveyors as shown in Fig. 17 may be used to arrange the packages for either automatic or manual casing as described above.

The controls for the operation of the freezing unit are shown schematically in Fig. 18. The principal control elements of the system are the double acting relays 82 and 83. The electrical elements of the system are controlled from a source 84 having lead lines 85 and 86 respectively extending therefrom. The packages are fed to the installation by the conveyor belt B which is driven by a motor M energized from the source 84 through the lead lines 85 and 87 and back to the source through the line 88, lower contacts 89 of the relay 82, and back to the lead line 86 through a line 90. The relays 82 and 83 are in the illustrated position during the feeding of the packages to the distribution device D.

When the designed number of packages, in the present instance eight, are positioned on the table 10, the limit switch 11 is actuated to close a circuit to the solenoid 91 of a solenoid valve (not shown) for admitting fluid to the cylinder 15. The circuit for energizing the solenoid 91 is from the source 84 through the lead line 85 to the solenoid 91, and from the solenoid 91 through a lead line 92, normally closed contacts 22b of the limit switch 22 through the limit switch 11 through a lower contact 93 of the relay 82 and through the lead lines 90 and 86 back to the source. When the pusher is advanced to its forward limit position, the limit switch 22 is actuated to open the contacts 22b and de-energize the solenoid 91 for the valve of the cylinder 15.

The contacts 22a of the switch 22 also impress a voltage across an impulse counter 94. The impulse counter 94 does not permit current flow until a predetermined number of impulses have been applied to it. The impulse is transmitted to the counter from the source 84 through the lead line 85, the upper half of the solenoid of the relay 82 through the contacts 95 of the relay 82, the contacts 96 of the relay 83 to one side of the counter, and from the other side of the counter through the contacts 22a to the line 86. When the pusher 12 returns to its normal position, the switch 22 is returned to the position illustrated in Fig. 18, thereby permitting a further operation. The packages from the feed table 10 are conveyed to the designed number of levels of the distributor D and a succeeding set of packages are advanced onto the feed table by the motor M.

When the predetermined number of packages has been advanced to load the horizontal runs of the distributing device, the counter operates to close the last-mentioned circuit through the upper half of the relay 82. This opens the contacts 89, 93, and 95 and closes the contacts 97 and 98. The motor M is de-energized when the contacts 89 are opened. The circuit to the limit switch 11 is opened, as well as the circuit to the upper half of the relay 82. The relay, however, stays in its upper position until the lower half of the relay is energized as described below.

Actuation of the relay 82 effects operation of the cylinders 28 and 68 for actuating respectively the loading ram C and the rack 49 carrying the movable plates 41. Before operation of these elements, however, a time delay is provided to permit the packages on the distributing conveyor D to travel to the upper horizontal runs of the distributor.

To effect the time delay, a time delay relay 100 is energized when the relay 82 is shifted to its upper position. The circuit for energizing the relay 100 from the source includes the lead line 85, the relay 100, the line 101, the contacts 98, and the lead lines 90 and 86 back to the source 84. After a predetermined time delay, the relay contacts 100a close to energize the upper portion of the relay 83. The circuit for this is from the line 85 through a line 102, the upper half of the relay 83, the contacts 104, lead line 105, the contacts 100a the line 86, back to the source. Shifting of the relay 83 opens the contacts 96 and 104 to insure de-energization of the upper parts of both relays 82 and 83, and closes the contacts 106, 107, and 108.

Closure of the contacts 108 energizes the solenoid 109 of a solenoid valve (not shown) controlling the flow of fluid to the cylinders 28 and 68. It is noted that the rack 49 operates to the open position prior to or in trailing relation to the load ram C, and to effect this sequential operation, a throttle is disposed in the fluid line to the cylinder 28 so that its operation is slower than that of the cylinder 68. The solenoid 109 is energized from the source 84 through the lead line 85, a line 110, the contacts 108, a lead line 111, to the line 86, and back to the source 84.

Closure of the contacts 106 operates to shift the relay 82 back to the position shown in full lines by energizing the lower half of the relay coil. The circuit for this is from the source 84 through the lead line 85, to the lower half of the coil, through the lead line 112, the contacts 97 which are closed and the contacts 106 to the other side of the source through the lead lines 111 and 86.

The relay 83 is actuated to its lower position when both the rack 49 and the load ram C are in their right hand limit positions. This is accomplished by the closure of both the limit switches 72 and 71. The circuit for energizing the lower half of the relay coil 83 is from the source 84 through the line 85, the line 102, the lower half of the relay 83, the lead line 113, the closed contacts 107, the lead line 114, the limit switches 72 and 71, and the lead line 86, back to the source. Thus, the circuit elements are back to the position shown in full lines in Fig. 18.

It is noted that as soon as the time delay relay is energized to close its contacts 100a, the relay 83 is energized upwardly to energize the relay 82 downwardly and start operation of the motor M and the elements of the circuit associated with the distributing device, but the elements retracting the loading ram are not energizable until both the loading ram and the movable plates have attained their right hand limit positions as determined by the limit switches 72 and 71.

Referring now to Figs. 1 and 18, the packages are brought into the distributor D by the belt B driven by the motor M. When the designated number of packages is on the roller table 10, the limit switch 11 is actuated to actuate the pusher 12 by means of the cylinder 15. The pusher is advanced and retracted a predetermined number of times, in the present instance twenty-five, until sufficient packages are pushed onto the distributor to fill the horizontal runs of the distributor. The motor M stops and after a predetermined time delay, the load ram C and the rack 49 are actuated to advance a row of packages through the freezer. After this advance, the operating elements return to their normal position while the packages are conveyed out of the freezer by the conveyors G and H to the table T where they are in position for casing. Thus, the present machine provides an installation which affords continuous freezing operation. The packages from the previous processing station are brought into the machine in a continuous line and are discharged, after being frozen, in proper alignment for casing.

While a particular embodiment of the present invention has been herein illustrated and described, it is not intended to limit the invention to such disclosure, but changes and modifications may be made therein and thereto within the scope of the following claims.

1. In a freezer for frozen food packages and the like, a series of vertically spaced substantially horizontal freezing plates arranged in pairs, each pair adapted to receive therebetween a full complement of aligned food packages disposed in successively abutting relation with each of said packages slidably supported by the lower plate of each pair, means to refrigerate said plates, one of said plates of each pair being fixedly mounted, means mounting the other of said plates of every pair for simultaneous movement relative to said one plate between relatively open and closed positions, said plates of every pair in said open position being spaced apart a distance greater than the height of said packages and in said closed position being disposed in pressure engagement with the packages therebetween, actuating mechanism operable simultaneously to dispose all of said pairs of plates alternately in said open and closed positions, and means operable to simultaneously feed a number of unfrozen packages less than said full complement of packages between each of said pairs of plates in the open position thereof and to advance all of the full complements of packages longitudinally of the plates a distance to discharge therefrom a like number of leading packages of all of said complements.

2. A freezer according to claim 1 including bumper means operable after actuation of said actuating mechanism to dispose said plates in open positions and before operation of said feeding means, said bumper means engageable by the leading package in the full complement and operable to dislodge the frozen packages from the freezing plates.

3. In a freezer for freezing frozen food packages and the like, first and second spaced substantially parallel freezing plates adapted to receive therebetween a series of aligned food packages disposed in successively abutting relation, means to refrigerate said plates, said plates being mounted for reciprocatory movement relative to one another in directions both parallel and normal to said plates between relatively open and closed positions, said plates in said open position being spaced apart a distance greater than the height of said packages and in said closed position being disposed in pressure engagement with the packages therebetween, actuating mechanism operable to dispose said plates alternately in said open and closed positions, means operable to feed unfrozen packages between said plates in the open position thereof, and means operable automatically upon operation of said plates toward said closed position to advance the series of packages longitudinally of the plates a distance to discharge therefrom the leading package of said series.

4. In a freezer for freezing frozen food packages and the like, first and second spaced substantially horizontal parallel freezing plates adapted to receive therebetween a series of aligned packages disposed in successively abutting relation, means to refrigerate said plates, said plates being mounted for reciprocatory movement relative to one another in directions both parallel and normal to said plates between relatively open and closed positions, said plates in said open position being spaced apart a distance greater than the height of said packages and in said closed position being disposed in pressure engagement with the packages therebetween, actuating mechanism operable to dispose said plates alternately in said open and closed positions, a loading ram reciprocable in a path parallel to said plates operable to feed unfrozen packages between said plates in the open position thereof, and means operable automatically upon operation of said plates toward said closed position to advance the series of packages longitudinally of the plates a distance to discharge therefrom the leading package of said series.

5. In a freezer for frozen food packages and the like, a series of vertically spaced substantially horizontal freezing plates arranged in pairs, each pair adapted to receive therebetween a series of aligned food packages disposed in successively abutting relation, means to refrigerate said plates, said plates of each pair being mounted for reciprocatory movement relative to one another in directions both parallel and normal to said plates between relatively open and closed positions, said plates of each pair in said open position being spaced apart a distance greater than the height of said packages and in said closed position being disposed in pressure engagement with the packages therebetween, actuating mechanism operable simultaneously to dispose said pairs of plates alternately in said open and closed positions, means operable to feed unfrozen packages between each of said pairs of plates in the open position thereof, and means operable automatically upon operation of said pairs of plates to said closed position to advance each of the series of packages longitudinally of the plates a distance to discharge therefrom the leading package of each of said series.

6. In a freezer for freezing frozen food packages and the like, first and second spaced substantially horizontal parallel freezing plates adapted to receive therebetween a series of aligned food packages disposed in successively abutting relation, means to refrigerate said plates, said plates being mounted for reciprocatory movement relative to one another in directions both parallel and normal to said plates between relatively open and closed positions, said plates in said open position being spaced apart a distance greater than the height of said packages and in said closed position being disposed in pressure engagement with the packages therebetween, actuating mechanism operable to dispose said plates alternately in said open and closed positions, said mechanism comprising a cam track supporting and guiding one of said plates for movement in directions both parallel and normal to said plates, and an actuating element for displacing said plate on said cam track, means operable to feed unfrozen packages between said plates in the open position thereof, and means operable automatically upon operation of said plates to said closed position to advance the series of packages longitudinally of the plates a distance to discharge therefrom the leading package of said series.

7. In a freezer for freezing frozen food packages and the like, first and second vertically spaced substantially horizontal freezing plates adapted to receive therebetween a series of aligned food packages disposed in successively abutting relation, means to refrigerate said plates, said plates being mounted for movement relative to one another in directions both parallel and normal to said plates between relatively open and closed positions, said plates in said open position being spaced apart a distance greater than the height of said packages and in said closed position being disposed in pressure engagement with the packages therebetween, actuating mechanism operable to dispose said plates alternately in said open and closed positions, a feed table pivotally mounted adjacent one end of the lower plate and extending horizontally to overlie the same for supporting the packages to be received between the plates, a loading ram engageable with the packages on said feed table operable in the open position of the plates to feed from the last mentioned packages, a succeeding package to the series of packages, and means operable automatically upon operation of said plates to closed position to engage said succeeding package of the series and advance the series of packages longitudinally of the plates a distance to discharge therefrom the leading package of said series.

8. A freezer according to claim 7 wherein said means to advance the series of packages comprises a longitudinally fixed abutment on the free end of said feed table slidably supporting the latter on said lower plate.

9. A freezer according to claim 7 including feed means to load said feed table, and control means operable upon completion of loading of said table to control said actuating mechanism to dispose said plates in said open position, and control said feed means simultaneously to arrest loading of said feed table.

10. In a freezer for freezing food packages and the like, first and second spaced substantially horizontal freezing plates adapted to receive therebetween a series of aligned food packages disposed in successively abutting relation, means adjacent one end of said plates for feeding unfrozen food packages therebetween, means adjacent the opposite end of said plates for discharging frozen food packages from between the plates, means fixedly mounting said first plate, means mounting said second plate for longitudinal and vertical movement relative to the first plate between open and closed positions, said second plate in open position being spaced apart from said first plate a distance greater than the height of said packages and offset longitudinally toward said opposite end, and in closed position being disposed in pressure engagement with the food packages between said plates, and longitudinally fixed abutment means adjacent said one end engageable by the trailing package of the series operable upon longitudinal movement of said second plate toward closed position to advance said series of packages longitudinally of the plates a distance to discharge therefrom the leading frozen package of said series.

11. In a freezer for freezing food packages and the like, first and second spaced substantially horizontal freezing plates adapted to receive therebetween a series of aligned food packages disposed in successively abutting relation, means defining an inlet to said freezer adjacent one end of said plates for feeding unfrozen food packages therebetween, means defining an outlet for said freezer adjacent the opposite end of said plates through which frozen food packages are discharged from between the plates, means fixedly mounting said first plate, means mounting said second plate for longitudinal and vertical movement relative to the first plate between open and closed positions, said second plates in open position being spaced apart from said first plate a distance greater than the height of each of said packages, and offset longitudinally toward said opposite end, and in closed position being disposed in pressure engagement with the food packages between said plates, and bumper means fixedly mounted adjacent said opposite end engageable by the leading package in said series upon relative longitudinal movement of the second plate to open position operable to dislodge the frozen packages from the freezing plates.

12. In a freezer for freezing food packages and the like, first and second spaced substantially parallel freezing plates adapted to receive therebetween a series of aligned food packages disposed in successively abutting relation, means defining an inlet to said freezer adjacent one end of said plates for feeding unfrozen food packages therebetween, means defining an outlet for said freezer adjacent the opposite end of said plates through which frozen food packages are discharged from between the plates, means mounting said plates for movement relative to one another between open and closed positions, said plates in open position being spaced apart a distance greater than the height of each of said packages and in closed position being disposed in pressure engagement with the food packages therebetween, bumper means engageable by the leading package in said series operable to dislodge the frozen packages from the freezing plates, means to feed a succeeding package to the series of packages, and abutment means engageable by said succeeding package of the series operable to advance said series of packages longitudinally of the plates a distance to discharge therefrom the leading frozen package of said series.

13. In a freezer for freezing food packages and the like, first and second spaced substantially horizontal freezing plates adapted to receive therebetween a series of aligned food packages disposed in successively abutting relation, means defining an inlet to said freezer adjacent one end of said plates for feeding unfrozen food packages therebetween, means defining an outlet for said freezer adjacent the opposite end of said plates through which frozen food packages are discharged from between the plates, means fixedly mounting said first plate, means mounting said second plate for longitudinal and vertical movement relative to the first plate between open and closed positions, said second plate in open position being spaced apart from said first plate a distance greater than the height of each of said packages and offset longitudinally toward said opposite end of the plates, and in closed position being disposed in pressure engagement with the food packages between said plates, bumper means fixedly mounted adjacent said opposite end engageable by the leading package in said series upon relative longitudinal movement of the second plate to open position operable to dislodge the frozen packages from the freezing plates, means adjacent said one end of the plates operable in the open position of the latter to feed a succeeding package to the series of packages, and longitudinally fixed abutment means adjacent said one end engageable by said succeeding package of the series operable upon longitudinal movement of said second plate toward closed position to advance said series of packages longitudinally of the plates a distance to discharge therefrom the leading frozen package of said series.

14. In a freezer for freezing food packages and the like, first and second spaced substantially horizontal freezing plates adapted to receive therebetween a series of aligned food packages disposed in successively abutting relation, means defining an inlet to said freezer adjacent one end of said plates for feeding unfrozen food packages therebetween, means defining an outlet for said freezer adjacent the opposite end of said plates through which frozen food packages are discharged from between the plates, means fixedly mounting said first plate, a rack mounting said second plate, a cam track supporting and guiding said rack and said second plate for longitudinal and vertical movement relative to the first plate between open and closed positions, said second plate in open position being spaced apart from said first plate a distance greater than the height of each of said packages and offset longitudinally toward said opposite end of the plates, and in closed position being disposed in pressure engagement with the food packages between said plates, drive means to effect reciprocating movement of said rack between open and closed positions, means adjacent said one end of the plates to feed a succeeding package to the series of packages, control means to actuate said feed means in timed relation to said drive means to feed the succeeding package to the plates in the open position of the latter, and longitudinally fixed abutment means adjacent said one end engageable by said succeeding package of the series operable upon longitudinal movement of said second plate toward closed position to advance said series of packages longitudinally of the plates a distance to discharge therefrom the leading frozen package of said series.

15. In a freezer for freezing food packages and the like, first and second spaced substantially horizontal freezing plates adapted to receive therebetween a series of aligned food packages disposed in successively abutting relation, means defining an inlet to said freezer adjacent one end of said plates for feeding unfrozen food packages upon said second plate beneath said first plate, means defining an outlet for said freezer adjacent the opposite end of said plates through which frozen food packages are discharged from between the plates, means fixedly mounting said first plate, a rack mounting said second plate, a cam track supporting and guiding said rack and said second plate for longitudinal and vertical movement relative to the first plate between open and closed positions, said second plate in open position being spaced apart from said first plate a distance greater than the height of each of said packages and offset longitudinally toward said opposite end of the plates, and in closed position being disposed in pressure engagement with the food packages between said plates, drive means to effect reciprocating movement of said rack between open and closed positions, a feed table pivotally mounted adjacent the one end of said plates and extending horizontally to overlie the second plate for supporting the said unfrozen packages, a loading ram engageable with the packages on said feed table operable to feed a succeeding package from the last-mentioned packages to the series of packages, control means to actuate said ram after actuation of said drive means to open position, and a longitudinally fixed abutment on the free end of said table slidably supporting the latter on the said one end of the second plate and engageable by said succeeding package of the series operable upon actuation of said drive means toward the closed position to advance said series of packages longitudinally of the plates a distance to discharge therefrom the leading frozen package of said series.

16. In a freezer for freezing food packages and the like, upper and lower spaced substantially horizontal freezing plates adapted to receive therebetween a series of aligned food packages disposed in successively abutting relation, means to refrigerate said plates, means adjacent one end of said plates for feeding unfrozen food packages to said plates, means adjacent the opposite end of said plates for discharging frozen food packages from the plates, means mounting said plates for relative movement between open and closed positions, said plates in open position being spaced apart a distance greater than the height of each of said packages, and in closed position being disposed in pressure engagement with the food packages between said plates, a feed table mounted adjacent to and overlying the one end of said lower plate for receiving and supporting the unfrozen packages from said feeding means and operable upon movement of said plates toward open position to be longitudinally displaced rearwardly relative to said lower plate and upon movement of said plates toward closed position to be longitudinally displaced forwardly relative to said lower plate, a loading ram engageable with the packages on said feed table operable in the open position of the plates to feed from the last-mentioned packages a succeeding package to the series of packages, and an abutment fixed on said table and slidably supporting said table on said lower plate adjacent said one end and engageable by said succeeding package of the series, operable simultaneously upon forward longitudinal movement of said table relative to said lower plate to advance said series of packages longitudinally of the plates a distance to discharge therefrom the leading frozen package of said series.

17. A freezer according to claim 16 including a scuff plate mounted on said lower plate intermediate said lower plate and said abutment to slidably support the latter, and wherein further said abutment has a sharp leading edge to scrape deposits from said scuff plate during its forward movement relative thereto.

18. In a freezer for freezing frozen food packages and the like, first and second vertically spaced substantially horizontal freezing plates adapted to receive therebetween a plurality of rows each having a full complement of aligned frozen food packages disposed in successively abutting relation with said packages slidably supported for horizontal movement on the lower plate, means to refrigerate said plates, said plates being mounted for movement relative to one another between relatively open and closed positions, said plates in open position being spaced apart a distance greater than the height of said packages and in closed position being disposed in pressure engagement with the packages therebetween, actuating mechanism operable to dispose said plates alternately in said open and closed positions, means operable to feed a number of unfrozen packages less than said full complement of packages between said plates in the open position thereof and to slide all of the rows of packages horizontally on the lower one of the plates a distance to discharge therefrom a like number of leading packages of every row whereby said packages are alternately advanced and compressed between said plates, a discharge chute extending across the width of the lower plate and mounted in registry with the discharge end of the lower plate to receive the packages discharged therefrom in the open position of the plates, said chute being inclined downwardly and terminating along its lower end in stop means to limit the downward travel of the packages on the chute and align the packages from every row whereby the packages of every row slide by gravity down said chute and against said stop means, pusher means including a finger element operable to overlie said stop means and engage the packages disposed thereagainst, the power means to displace said pusher means laterally along said discharge chute to slide the packages endwise therefrom.

19. A freezer according to claim 18 including control means to operate said pusher power means upon movement of said plates to closed position.

20. A device according to claim 18 including means on said discharge chute operable to engage the packages in the lower limit position thereof to dispose the upper ends thereof above the level of said lower plate.

References Cited in the file of this patent

UNITED STATES PATENTS

| | | |
|---|---|---|
| 2,242,527 | Knowles | May 20, 1941 |
| 2,531,210 | Gilson | Nov. 21, 1950 |
| 2,578,829 | Nicholson | Dec. 18, 1951 |
| 2,631,440 | Polk | Mar. 17, 1953 |
| 2,697,920 | Mackenzie | Dec. 28, 1954 |

FOREIGN PATENTS

| | | |
|---|---|---|
| 77,322 | Norway | Aug. 28, 1950 |
| 985,441 | France | Mar. 14, 1951 |